United States Patent
Emmons, Jr. et al.

(10) Patent No.: US 7,545,751 B2
(45) Date of Patent: Jun. 9, 2009

(54) METHOD FOR TRANSCODER OPTIMIZATION FOR GROUP DISPATCH CALLS

(75) Inventors: Thomas P. Emmons, Jr., Mesa, AZ (US); Janus P. Burks, Richland Hills, TX (US); Brian J. Towey, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 383 days.

(21) Appl. No.: 11/095,190

(22) Filed: Mar. 31, 2005

(65) Prior Publication Data

US 2006/0221871 A1 Oct. 5, 2006

(51) Int. Cl.
*H04L 12/16* (2006.01)
*H04Q 11/00* (2006.01)
(52) U.S. Cl. .................. 370/252; 370/261; 455/518
(58) Field of Classification Search ......... 370/260–262, 370/264, 270, 252, 236, 352, 354, 335, 468; 704/201, 221; 455/405, 410, 450, 451, 414.1, 455/419, 556.1, 507, 422.1, 517–519, 554.1, 455/554.2

See application file for complete search history.

(56) References Cited

U.S. PATENT DOCUMENTS

| | | | |
|---|---|---|---|
| 6,574,469 B1 * | 6/2003 | Xiang et al. | 455/416 |
| 6,829,341 B2 * | 12/2004 | Contreras | 379/177 |
| 6,954,441 B2 * | 10/2005 | Musikka | 370/328 |
| 7,149,515 B2 * | 12/2006 | Hallin et al. | 455/432.2 |
| 2003/0195981 A1 | 10/2003 | Graf et al. | |
| 2004/0196867 A1 | 10/2004 | Ejzak et al. | |
| 2004/0240399 A1 * | 12/2004 | Corrao et al. | 370/260 |
| 2006/0120350 A1 * | 6/2006 | Olds et al. | 370/352 |

* cited by examiner

*Primary Examiner*—Seema S Rao
*Assistant Examiner*—Mon Cheri S Davenport

(57) ABSTRACT

A method for minimizing the number of transcoders needed to support group calls includes a first step of receiving a request from a call initiator to initiate a group call with a plurality of call targets. Next, a listing of call initiator vocoders supported by the call initiator is received. Then, a call invitation is sent to each of a plurality of networks associated with the call targets. Network responses are received from each of the plurality of networks. The network responses comprise one or more network supported vocoders. The responses from all of the plurality of networks are collected. Then, the amount of transcoder needed to support the group call is optimized by minimizing the number of call initiator vocoders and network supported vocoder pairs.

20 Claims, 4 Drawing Sheets

METHOD FOR TRANSCODER OPTIMIZATION FOR GROUP DISPATCH CALLS

TECHNICAL FIELD OF THE INVENTION

This invention relates to the field of wireless communication and, more specifically to a method for transcoder optimization for group dispatch calls.

BACKGROUND OF THE INVENTION

Different communication service providers typically utilize different and often incompatible communication networks. As a result, mobile phones used in one communication network may use different vocoders to convert speech to digital signals and digital signals to speech than mobile phones used in another communication network In order for mobile phones with different vocoders to communicate with each other, a transcoder is required to convert between the vocoders. Transcoders are typically deployed in communication gateways. The communication gateway receives the call initiation information from a call initiator trying to contact a call target. The communication gateway then contacts the network associated with the call target, determines the vocoders supported by the network and sets up a transcoder to translate between different vocoders.

A group dispatch call is a call that allows a user to contract a group of individuals and speak to them all at once. When a group call takes place within the same network, each participant is using compatible equipment and no transcoder is required. However, group calls that include participants in different networks typically require the use of transcoders. Since a large number of individuals can be part of a group call, the potential number of transcoders that have to be setup can be very large. For example, in one embodiment there can be up to twenty-one (21) participants to the group call. If each participant is in a network that uses a different vocoder than the call initiator, up to twenty (20) possible transcoders are needed to support the delivery of voice from the original call initiator to the other participants in the group call. When the speaking party switches from the call initiator to another party to the call, a different set of twenty (20) transcoders may need to be used. Therefore, at worst case a total of two-hundred and ten (210) different transcoders will be needed to support the group calls. Because of this large requirement of transcoding resources, what is needed is a method for optimizing transcoders for group dispatch calls.

BRIEF DESCRIPTION OF THE DRAWINGS

The present invention will hereinafter be described in conjunction with the following drawing figures, wherein like numerals denote like elements, and.

DETAILED DESCRIPTIONS OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
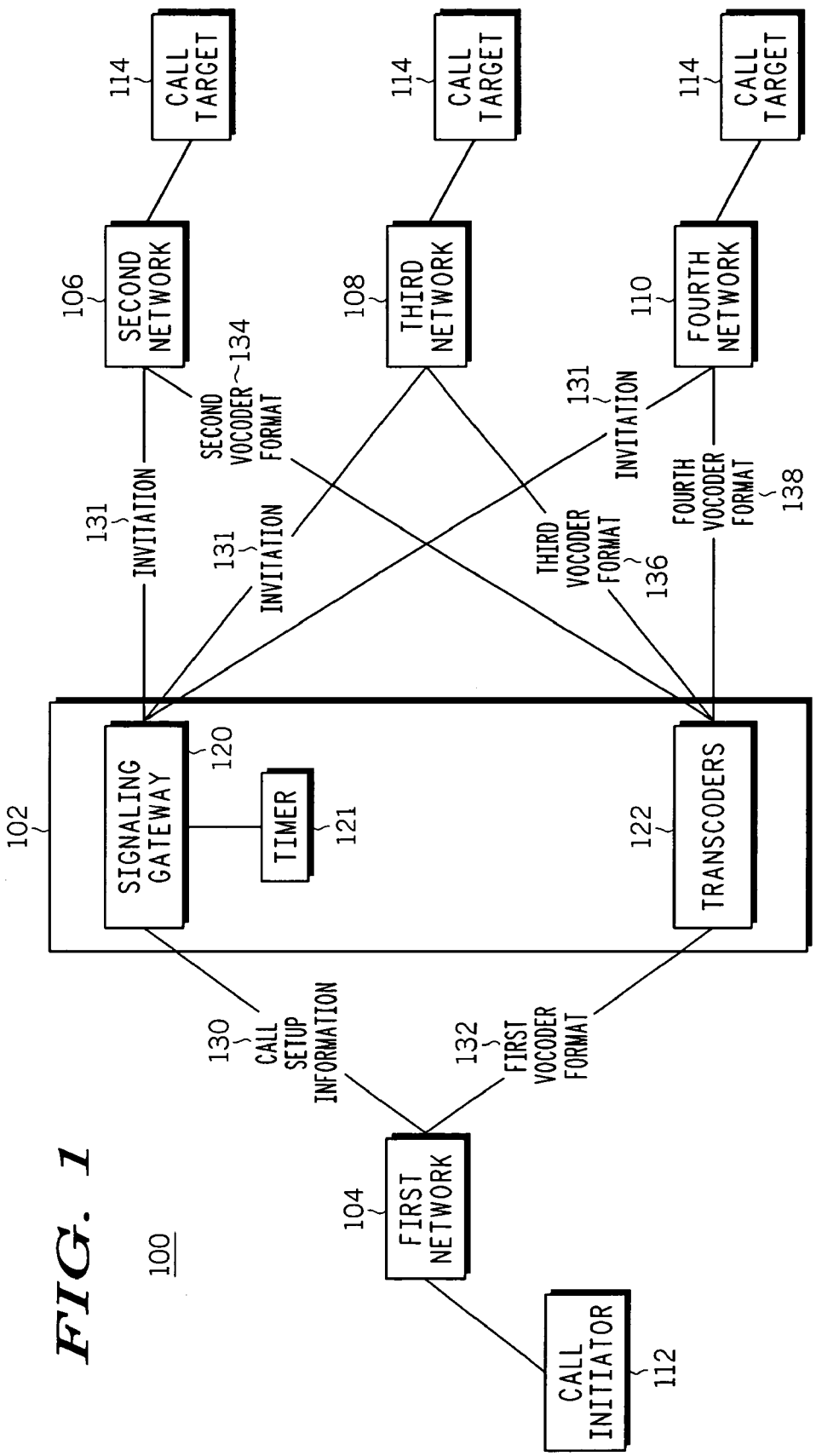
FIG. 1 illustrates an exemplary communication system for use in the present invention.

FIG. 1 illustrates an exemplary communication system 100 for use with the present invention. The communication system 100 includes a communication gateway 102 coupling a first network 104 to a second network 106, a third network 108 and a fourth network 110. A call initiator 112 is in communication with the first network 104. Call targets 114 are in communication with the second network 106, third network 108 and fourth network 110, respectively.

The call initiator 112 is a communication device that is used to initiate a group call with the call targets 114, which are also communication devices. The call initiator 112 and the call targets 114 can initiate and receive calls, including group calls where a caller is able to establish communication with more than one call target 114. Call initiator 112 and call targets can be mobile phones, landline phones, wireless communication devices such as personal digital assistants (PDAs), and the like.

First network 104, second network 106, third network 108 and fourth network 110 can be any telecommunication network that supports group calls. In an exemplary embodiment, the first network 104 uses a different network standard than the second network 106, the third network 108 and the fourth network 110. For example, the first network 104 may be an iDEN network while the other networks may be CDMA networks or GSM networks.

The communication gateway 102, in one embodiment of the present invention, comprises a signaling gateway 120 and one or more transcoders 122. The signaling gateway 120, in one embodiment, receives call setup information 130 from the first network 104. The call setup information 130 can include information needed to reach the call targets 114 as well as information regarding the type of vocoders supported by first network 104. The signaling gateway 120 can then issue an invitation 131 to each of the networks that support the call targets 114. In response, each network sends information to the signaling gateway regarding the vocoders that are supported in that network.

Currently, as the signaling gateway 120 receives signaling responses from the networks indicating which vocoders are supported in a particular network, transcoders 122 are provisioned to handle the translation between the vocoder supported by the first network 104 and the vocoders supported by the other networks. Transcoders 122, in one embodiment, are digital signal processors that can translate between different vocoders. However, any processing device capable of vocoder translation, including software, can be used.

For example, as illustrated in FIG. 1, data sent using a first vocoder format 132 is translated at the transcoder 122 for delivery to the second network 106 in a second vocoder format 134. The transcoder 122 also translates the first vocoder format 132 to a third vocoder format 136 for the third network 108 and to a fourth vocoder format 138 for the fourth network 110. Therefore, in the prior art, a transcoder was setup for vocoder translation as the vocoder information was received by the signaling gateway 120. Transcoder 122 can be multiple transcoders 122 if the second vocoder format 134, the third vocoder format 136 or the fourth vocoder format 138 are different from each other and the first vocoder format 132.

In one embodiment of the present invention, the signaling gateway 120 waits until each network responds with a listing of vocoders that are supported by each network. Then the signaling gateway optimizes the selection of transcoders such that a single transcoder can translate between vocoder combinations that occur more than once.

Figure 2:
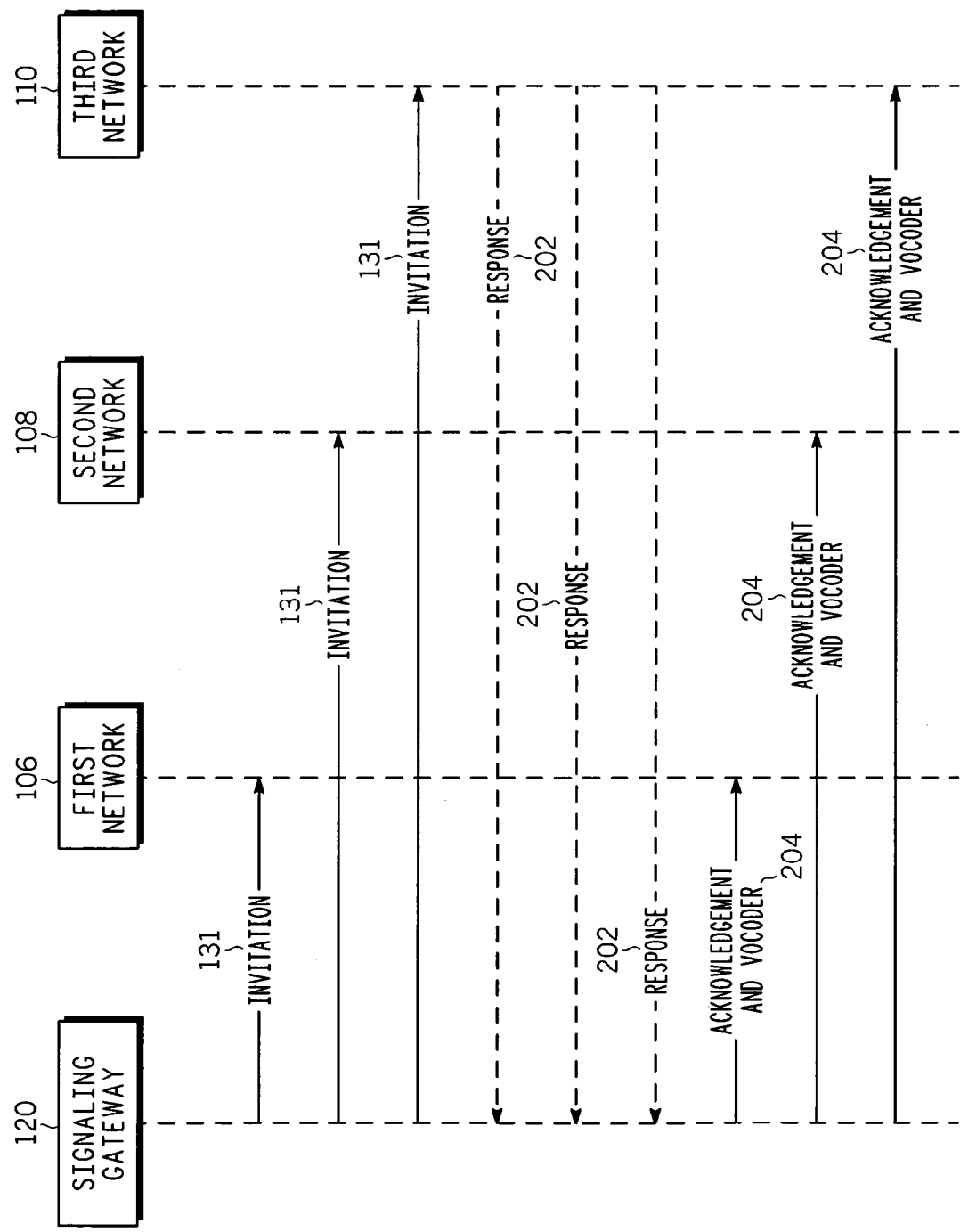
FIG. 2 is a sequence diagram of an exemplary embodiment of the present invention.

A sequence diagram of an exemplary method of the present information is illustrated in FIG. 2. In FIG. 2, the signaling gateway 120 first sends an invitation 131 to the second network 106, the third network 108 and the fourth network 110. In one embodiment the invitation 131 is sent using the session initialization protocol (SIP) although any protocol can be used to send invitation 131. In response, each of the networks 104, 10, 108, 110 sends a response 202 acknowledging reception of the invitation. Also, each of the networks 104, 10, 108, 110 sends to the signaling gateway 120 a list of vocoders that are supported by that network Previously, as each network sent a vocoder offer, the signaling gateway 120 would select a vocoder and set up the transcoder 122 to translate between the vocoders. In one embodiment of the present invention, the signaling gateway 120 waits until all of the networks respond back with vocoder offers. After all of the vocoder offers are collected, the signaling gateway 120 uses an optimization algorithm to minimize the number of transcoders required to translate between vocoders by selecting vocoders common to as many networks as possible. In another embodiment, the signaling gateway 120 waits until the expiration of a timer 121 initially triggered when the signaling gateway 120 sent the invitation 131. All vocoder offers that have been collected before the expiration of the timer 121 can be optimized.

As an example, assume the second network 106 supports SMV and EVRC vocoders and offers those in response to the invitation 131. The third network 108 offers EVRC as its supported vocoder and the fourth network 110 offers G711 and EVRC as its supported vocoders. The first network 104 supports only AMBE. Previously, as each offer came in from a network the signaling gateway 120 would negotiate what vocoders to use. Thus, previously the signaling gateway 120 would negotiate an AMBE to SMV transcoder for communication between the first network 104 and the second network 106, an AMBE to EVRC transcoder for communication between the first network 104 and the third network 108, an AMBE to G711 transcoder for communication between the first network 104 and the fourth network 110. Also, since any participant to a group call can become the active speaker (the participants are said to "have the floor" when they are the speaking party) additional transcoders are needed to handle calls between other combination of networks. Therefore, a SMV to EVRC transcoder for communication between second network 106 and third network 108, a SMV to G711 transcoder for communication between second network 106 and fourth network 110, and an EVRC to G711 transcoder for communication between third network 108 and fourth network 110 are also needed.

In one embodiment of the present invention, the signaling gateway 120 waits until all vocoder offers are received (or a preset time expires). In this example, the second network 106 offered SMV and EVRC, the third network 108 offered EVRC and the fourth network 110 offered G711 and EVRC. Since the signaling gateway 120 waited for all networks to respond, the signaling gateway 120 can now optimize the choice of vocoders. Since EVRC is common to the second network 106, the third network 108 and the fourth network 110, the signaling gateway 120 only needs to setup one transcoder, an AMBE to EVRC transcoder. A bypass of EVRC to EVRC is also needed for communication between second network 106, third network 108 and fourth network 110. Instead of six transcoders, only one is needed, resulting in a more efficient use of system resources. Also, for the EVRC to EVRC bypass, voice quality is improved since no transcoding is required.

In the previous example, optimization occurred after all of the networks responded. In an alternative embodiment of the present invention, upon sending of the invitation 131, a timer 121 is initiated. Once the timer 121 expires, the optimization algorithm is run even if not all of the networks have responded. Then the responses that are received after the timer 121 expired are individually optimized. This prevents the system from waiting for a response from a network that is unable to respond. In another embodiment, the timer 121 can be configured to measure two or more time periods. For example, the timer could restart after stopping to measure one or more periods of time. All responses that are received during each time period can be optimized.

Figure 3:
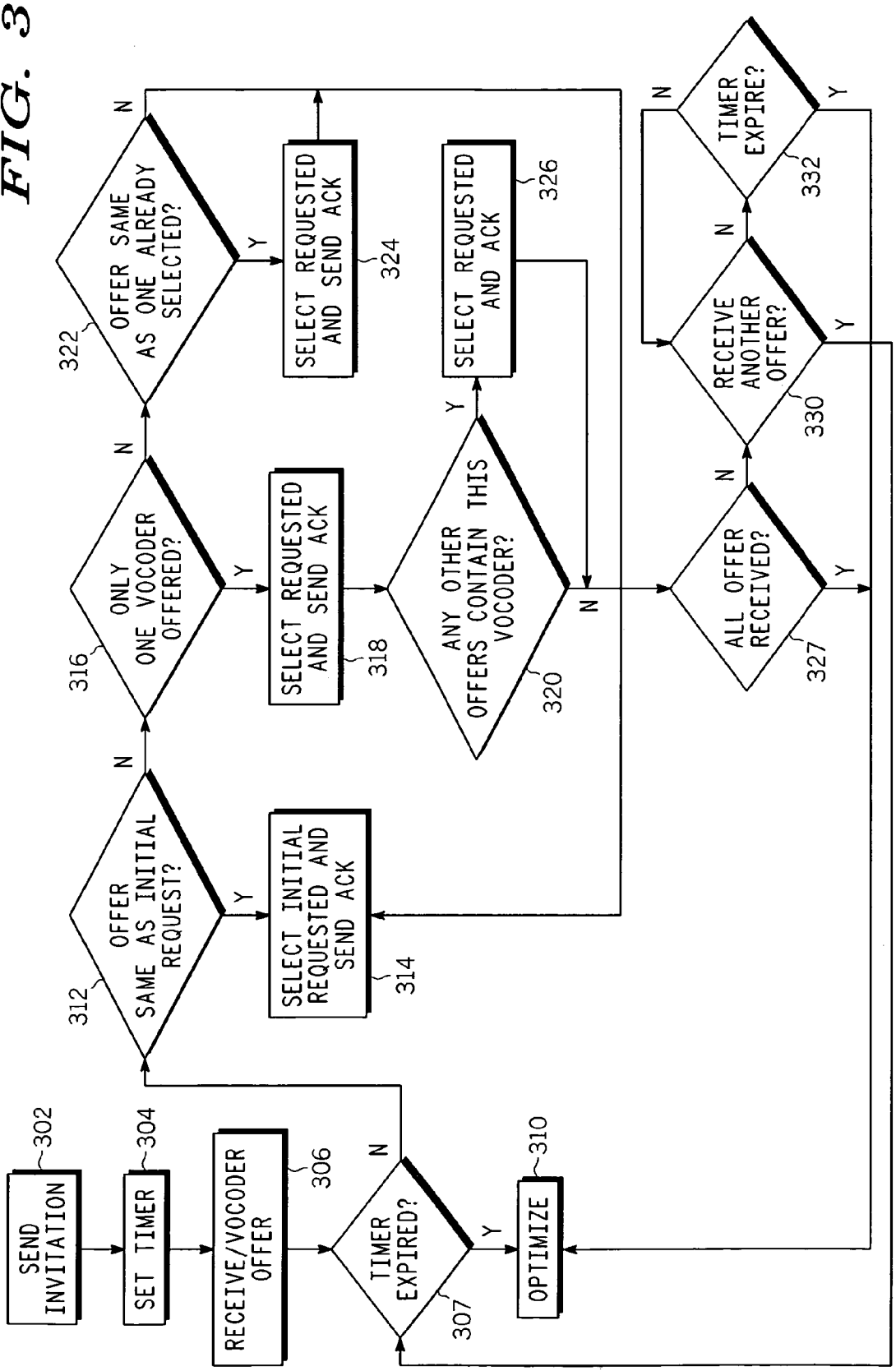
FIG. 3 is a flowchart illustrating an exemplary embodiment of the present invention.

A flowchart of an exemplary embodiment of optimizing transcoder resources is illustrated in FIG. 3. In a first step, step 302, the signaling gateway 120, having already received a request for a group dispatch call from a call initiator, sends invitations 131 to each of the networks associated with call targets of the group call. Also, a timer 121 can be initiated (step 304). The use of a timer 121 and the steps related to the use of a timer 121 are optional.

In step 306, a vocoder offer is received from one of the networks at the signaling gateway 120. After receiving the vocoder offer, the signaling gateway 120 can determine if the timer 121 has expired (step 308). If the timer 121 has expired, then the optimization routine is executed using the information from all the networks that responded before the expiration of the timer 121 (step 310).

If the timer 121 has not expired, the signaling gateway 120 determines if any of the offered vocoders is the same as the vocoder of the call initiator and if the call initiator offered only one vocoder (step 312). If so, the call initiator's vocoder is selected and an acknowledgement is sent back to the offering network (step 314). Then the signaling gateway 120 determines if all the vocoder offers have been received from all of the networks (step 328). If all vocoder offers have been received, then the optimization algorithm is executed (step 310). If not all the vocoder offers have been received, the signaling gateway 120 determines if another vocoder offer has been received (step 330). If another vocoder offer has been received, the method continues at step 308. If another vocoder offer has not been received, the timer 121 is checked in step 332. If the timer 121 has expired, the optimization routine is run at step 310. If the timer 121 has not expired, the method continues to check for other vocoder offers in step 330.

If, in step 312, the vocoder offer did not include a vocoder that was the same as the vocoder of the call initiator, the signaling gateway 120 determines if the received vocoder offer contained only one vocoder (step 316). If only one vocoder was offered, that vocoder is selected for use and an acknowledgement is sent to the offering network (step 318). Next, the signaling gateway 120 determines if any other vocoder offer from any other network that has already been received contains this vocoder (step 320). Since a transcoder already needs to be provided for this vocoder, all offers containing this vocoder will have this vocoder chosen and an acknowledgement sent to the offering networks (step 326). Then, the signaling gateway 120 determines if another vocoder offer has been received (step 330). If another vocoder offer has been received, the method continues at step 308. If another vocoder offer has not been received, the timer 121 is again checked in step 332. If the timer 121 has expired, the optimization routine is run at step 310. If the timer 121 has not expired, the method continues to check for other vocoder offers in step 330.

If no other vocoder offers contained this vocoder, then, the signaling gateway 120 determines if all vocoder offers have been received (step 328). If all vocoder offers have been received, then the optimization algorithm is executed (step 310). If not all vocoder offers have been received, it is determined if another vocoder offer has been received (step 330). If another vocoder offer has been received, the method continues at step 308. If another vocoder offer has not been received, the timer 121 is again checked in step 332. If the timer 121 has expired, the optimization routine is run at step 310. If the timer 121 has not expired, the method continues to check for other vocoder offers in step 330.

If, in step 316, the signaling gateway 120 determines that more than one vocoder has been offered, then, the signaling gateway 120 determines in step 322 if any of the offered vocoders are the same as one that has already been selected (and for which a transcoder has already been established) (step 322). If the vocoder offering includes an already selected vocoder, then that common vocoder is selected from the current offer and an acknowledgement is sent to the offering network (step 324). Then, the signaling gateway 120 determines if another vocoder offer has been received (step 330). If another vocoder offer has been received, the method continues at step 308. If another vocoder offer has not been received, the timer 121 is again checked in step 332. If the timer 121 has expired, the optimization routine is run at step 310. If the timer 121 has not expired, the method continues to check for other vocoder offers in step 330.

If, in step 322 the signaling gateway 120 determines that the vocoder offered is not the same as the vocoder already selected, the, the method continues at step 328, where it is determined if all vocoder offers are received. If all vocoder offers have been received, then the optimization algorithm is executed (step 310). If not all vocoder offers are received, it is determined if another vocoder offer has been received (step 330). If another vocoder offer has been received, the method continues at step 308. If another vocoder offer has not been received, the timer 121 is again checked in step 332. If the timer 121 has expired, the optimization routine is run at step 310. If the timer 121 has not expired, the method continues to check for other vocoder offers in step 330.

Figure 4:
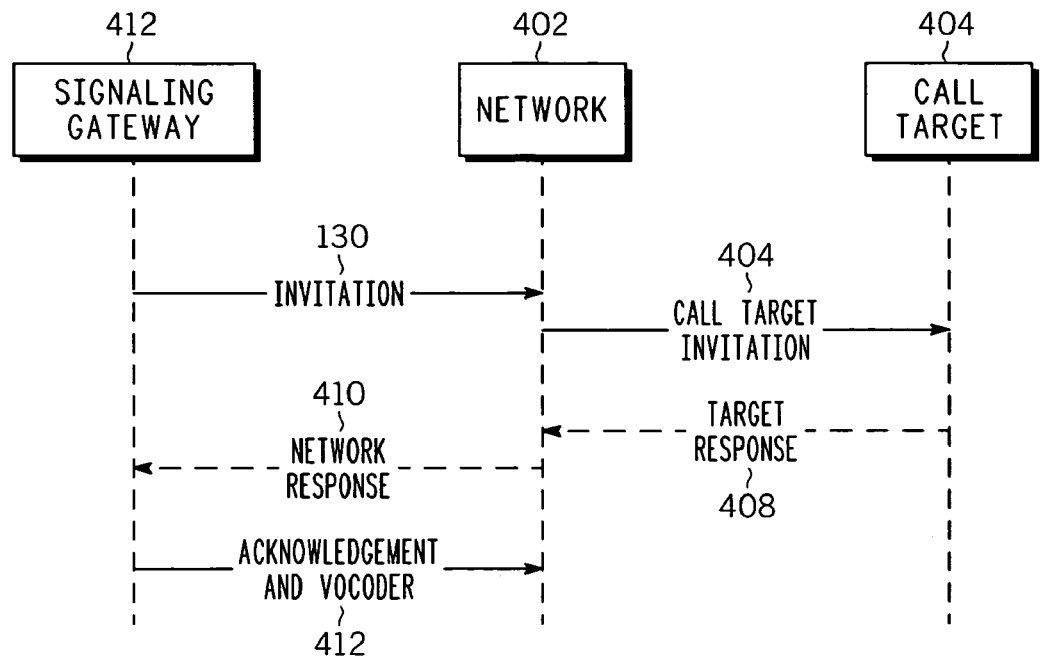
FIG. 4 is a sequence diagram of another embodiment of the present invention in which the call target is contacted and responds before the network responds to the call invitation.

FIG. 4 is a sequence chart illustrating another embodiment of the present invention. In FIG. 4, the signaling gateway 120 sends the invitation 131 to a network 402. The network 402 then sends a call target invitation 404 to a call target 406 associated with the network 402. In this embodiment, a target response 408 to the call target invitation 404 is sent before the network has responded to the initial message. The target response 408 indicates the call target 406 is ready to become a part of the call being setup. Then, when a network response 410 is sent, in addition to a vocoder offer, the network response 410 can have a tag indicating that the call target 406 has been reached. The signaling gateway 120 sends a gateway acknowledgment 412 in reply to the network response 410. The gateway acknowledgement 412 includes a chosen vocoder. In this embodiment, the vocoder can be chosen from those offered in the network response 410 without any optimization. This can be done to avoid increases in call setup time. The signaling gateway 120 knows to select a vocoder in this embodiment without optimizing because network response 410 includes an indication that the call target is ready.

Figure 5:
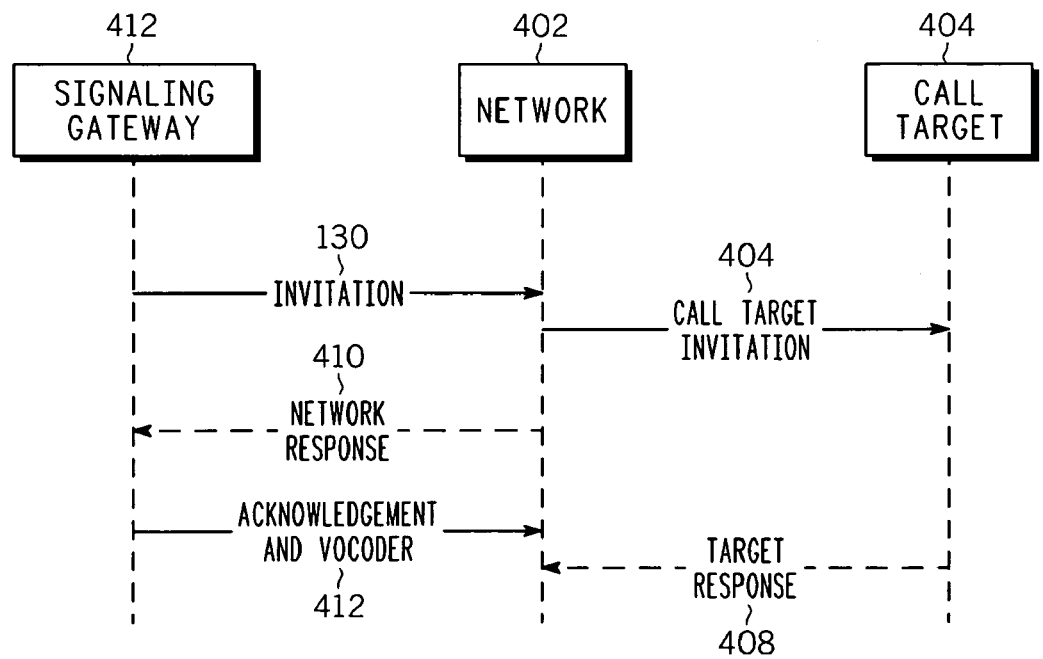
FIG. 5 is a sequence diagram of yet another embodiment of the present invention where the call target is contacted but does not respond before the network responds to the call invitation.

Alternatively, as illustrated in FIG. 5, the network 402 may send back the network response 410 in reply to the invitation 131 from the signaling gateway 120 that includes a vocoder offer without waiting for a response from the call target 406. The network response 410 can contain an indication that the call target 406 has not responded. Therefore, the signaling gateway 120 can wait until vocoder offers from different networks are received and can optimize the vocoders before the call target 404 responds to the target invitation 404 with the target response 408.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A method for optimizing resources in a communication system comprising a call initiator of a group call serviced by an initiator network, the call initiator supporting a call initiator vocoder, the method comprising:
   sending a group call invitation for the group call to a plurality of target networks associated with call targets of the group call invitation;
   collecting responses from each of the plurality of target networks, the responses comprising vocoder offers that comprise one or more vocoders supported by each of the plurality of target networks;
   after all responses are collected, determining whether a same vocoder is offered by multiple target networks of the plurality of target networks; and
   optimizing resources by, in response to determining that the same vocoder is offered by the multiple target networks, selecting said same vocoder from the vocoder offers for communications between the initiator network and the multiple target networks of the plurality of target networks.

2. The method of claim 1 wherein the step of optimizing further comprises:
   initiating a timer when sending the group call invitation; and
   at the expiration of the timer, optimizing resources using all responses received prior to the expiration of the timer.

3. The method of claim 1 wherein the step of optimizing further comprises selecting a vocoder offered by a target network if the vocoder is the same as the call initiator vocoder and if there was only one call initiator vocoder.

4. The method of claim 1 wherein the step of optimizing further comprises selecting a vocoder offered by a target network if the vocoder is the only vocoder offered by the network.

5. The method of claim 4 further comprising the step of:
   determining if any other target network of the plurality of target networks offered the vocoder; and
   selecting the vocoder for each of the plurality of target networks that offered the vocoder.

6. The method of claim 1 wherein the step of optimizing further comprises selecting a vocoder offered by a target network if the vocoder has already been selected for use.

7. The method of claim 1 further comprising:

sending a call target invitation from each of the plurality of target networks to call targets associated with the plurality of target networks; and sending the response from the each of the target networks prior to receiving an acknowledgement from the call targets.

8. The method of claim 1 further comprising:

sending a call target invitation from each of the plurality of target networks to call targets associated with the plurality of target networks; and receiving an acknowledgement from the call targets prior to sending the response from the each of the target networks.

9. The method of claim 8 further comprising receiving an indication in the response that the call target is ready for participating in the group call.

10. The method of claim 9 farther comprising setting up a call between the call initiator and any call target that is ready for participation in the group call before the step of optimizing.

11. A communication gateway comprising:

a signaling gateway configured to collect, in response to a call setup invitation, vocoder offerings comprising one or more vocoders from each of a plurality of target networks associated with call targets of a group call invitation, after all offereings are collected, determining whether a same vocoder is offered by multiple target networks of the plurality of target networks, and optimize resources by, in response to determining that the same vocoder is offered by the multiple target networks, selecting said same vocoder from the one or more vocoders offered by each of the plurality of target networks for communications between a call initiator network and the multiple target networks of the plurality of target networks; and a plurality of transcoders coupled to the signaling gateway, each of the plurality of transcoders operable to perform translation between vocoders.

12. The communication gateway of claim 11 further comprising a timer coupled to the signaling gateway, the timer configured to start when the signaling gateway initiates a call setup invitation and to stop after a predetermined period of time.

13. The communication gateway of claim 12 wherein the signaling gateway is further configured to stop collecting vocoder offerings when the timer stops and to optimize the selection of any vocoders offered during the predetermined period of time.

14. The communication gateway of claim 12 wherein the timer is further configured to restart after terminating to time one or more additional periods of time.

15. The communication gateway of claim 14 wherein the signaling gateway is further configured to stop the collection of vocoder offerings upon the termination of each additional periods of the timer and to optimizing, after each additional periods of time, the selection of any vocoders offered during each of the additional periods of time.

16. A method for minimizing an amount of transcoder formats needed to support group calls comprising:

receiving a request to initiate a group call with a plurality of call targets from a call initiator;

receiving from the call initiator a listing of call initiator vocoders supported by the call initiator;

sending a call invitation to each of a plurality of target networks associated with the call targets;

receiving network responses from each of the plurality of target networks, the target network responses comprising one or more network supported vocoders;

collecting responses from all of the plurality of target networks;

after all responses are collected, determining whether a same vocoder is supported by multiple target networks of the plurality of target networks;

optimizing the transcoder formats needed to support the group call by selecting a vocoder based on the call initiator vocoders and further based on whether a common vocoder is supported by multiple target networks of the plurality of target networks.

17. The method of claim 16 wherein the step of collecting responses from each of the plurality of networks further comprises collecting responses from all of the plurality of networks that respond within a set period of time.

18. The method of claim 16 wherein the step of collecting further comprises selecting a vocoder offered by a target network if the vocoder is the same as the call initiator vocoder and if there is only one call initiator vocoder.

19. The method of claim 16 wherein the step of collecting further comprises:

selecting a vocoder offered by a target network if the vocoder is the only vocoder offered by the target network;

determining if any other target network of the plurality of target networks offered the vocoder; and selecting the vocoder for each of the other target networks of the plurality of target networks that offered the vocoder.

20. The method of claim 16 wherein the step of collecting further comprises selecting a vocoder for a target network if the vocoder has already been selected.

* * * * *